UNITED STATES PATENT OFFICE.

WILLIAM ALBERT ADAMS, OF CINCINNATI, OHIO.

PROCESS OF PREPARING AND UTILIZING ROCK ASPHALT.

SPECIFICATION forming part of Letters Patent No. 528,841, dated November 6, 1894.

Application filed February 7, 1894. Serial No. 499,398. (No model.)

*To all whom it may concern:*

Be it known that I, WILLIAM ALBERT ADAMS, a citizen of the United States, and a resident of the city of Cincinnati, in the county of Hamilton and State of Ohio, have invented a certain new and useful Process of Preparing and Utilizing Kentucky Rock Asphalt, of which the following is a specification.

The name, "rock asphalt," definitely represents a certain kind of asphalt, in certain portions of the earth.

Kentucky rock asphalt, or bituminous sandstone consists principally of sand and asphalt or maltha and occurs in great quantities of such a character as to be of no value when used alone. Many efforts have been made to utilize such Kentucky rock asphalt by heating the same, also by mixing it with liquid Trinidad asphalt and residuum as well as other asphalts, (the latter rendered liquid by heat,) and then mixing the same together, also by mixing powdered limestone to harden them, and in numerous other ways and combinations, all of which have proven practically worthless as a paving or roofing material, or any of the uses to which asphalt is applied.

Thus far experiments have demonstrated that rock asphalts cannot be mixed or blended together uniformly by the application of heat.

I have discovered a process whereby such asphalts can be utilized to produce an exceedingly fine and valuable article.

I will describe this process, in detail, to wit: I take bituminous sandstone or Kentucky asphalt and reduce the same by grinding to the condition of a bituminous sand composed of single grains of sand, each grain with its coating of soft asphalt or maltha, which alone is too soft and lacks the cohesiveness necessary for any of the uses to which asphalt is applied. Then I take any rock or other hard asphalt, or combination of same, and reduce it to a very fine powder or dust. I then take ninety to ninety-five per cent. of such ground sand rock or Kentucky asphalt, or bituminous sand and reduce the temperature of the same to about 40° to 50° Fahrenheit, so that the grains of sand composing the same will not gum or stick together and convey and mix the same while at such reduced temperature to a mixer where I add five to ten per cent. of said powdered hard asphalt or asphalt dust. Then the two materials are thoroughly agitated and mixed in the dry and cool condition to which it has been brought until each grain of asphaltic sand has become fully covered with an adhering coat of asphaltic powder or dust. When such mixture or combination of asphalts is to be used it should be heated by hot air or dry steam to about 400° Fahrenheit in a suitable machine with constant agitation or stirring, as heating directly, as in a pan or equivalent receptacle over a fire, requires too much care to prevent the compound from being burned.

To sum up, there are three principal steps in my improved process, to wit: First, the reduction of bituminous sand rock or Kentucky asphalt, by grinding and sifting, at a moderate temperature, usually from about 30° to 50° Fahrenheit, to its own separate or individual grains. When so ground, each grain of sand has its coating of maltha or soft asphalt. Second, the reduction of hard or rock asphalt, preferably those containing carbonate of lime, by grinding and bolting to an impalpable flour (the same as wheat flour) at a moderate temperature, usually from about, say 30° to 50° Fahrenheit. Third, I then take from about ninety to ninety-five per cent. of said grains of sand with the sticky coating of maltha or soft asphalt on each grain and add to them from about five per cent. to ten per cent. of the finely pulverized hard asphalt or asphaltic flour, with constant stirring or mixing at a temperature of from about 30° to 50° Fahrenheit, and until each grain of sand with its adhering coat of maltha or soft asphalt has become covered with a coating of said hard asphaltic flour. When this is done, I have an asphalt powder perfectly blended and of a more uniform consistency than can be obtained with asphalts made liquid and blended by heat.

Some of the advantages of my invention are as follows: I have found from practical experiments that asphalt pavements laid in sheet form in accordance with my invention will withstand the action of heat and frost better than that produced by any other known process of mixing or combining of asphaltic rock materials, and will not become soft and spread out to lower levels under the action of the sun or travel, nor will it become brittle in cold weather, but will hold its shape under whatever form it is laid either upon steep roofs or heavy grades upon streets.

My new process brings into commercial use a heretofore practically useless form of rock asphalt when made according to my invention, and can be prepared and shipped in bulk or packed in bags or barrels ready to lay (by simply heating the mixture) for any of the purposes for which asphalt can be used.

The object of reducing the hard asphalt to an impalpable flour or dust, is that it, the harder asphalt requiring greater heat to fuse or combine, so that when blended in proper proportions, the heat required to soften the harder asphalt (which is necessary, when it is to be used) will not injuriously affect the soft asphalt or bituminous sand rock, but will form a perfectly uniform combination of the two asphalts for the purpose specified. It is also necessary to have the hard asphalts reduced to a very fine flour, as aforementioned, for the reason that it takes much less of it to properly blend with the softer or reduced (granular) Kentucky bituminous sand rock or asphaltic sandstone, which thus effects better results as it produces an asphaltic powder of uniform quality which is very essential, for all the purposes for which asphalts are used.

I do not claim as new or original the mixing or blending of hard and soft asphalts to produce a mixture of proper consistency.

I am aware that the same asphalts my process will use successfully have been tried by grinding both to mealy or granular condition and then mixing, heating or mixing while being heated, but have failed practically for want of uniformity in blending, for unless properly blended before application of heat, no heating, however carefully done, will give the asphalt the proper consistency on account of the great difference in the heat required to soften them or render both plastic.

What I claim as new and original by my process is the perfect mixing and blending of hard and soft asphalt rocks or bituminous sand by the dry and cool method without the aid of heat to produce such blending and mixing, and the use of heat after such blending and mixing to bring said properly blended mixture to a plastic condition.

What I claim as new and of my invention, and desire to secure by Letters Patent, is—

1. A process of preparing and using rock asphalts by reducing Kentucky rock asphalt or bituminous rock or sand to its own individual grains or granular conditions, and reducing to an impalpable flour hard or rock asphalt and thoroughly intermixing and blending the same without the aid of heat or liquids, the same when to be used to be rendered plastic by heat, substantially as and for the purposes specified.

2. The herein described process of mixing asphaltic materials by reducing asphaltic sand rock or bituminous sandstone to its own individual grains with their adhering coating of asphalt, and cooling same to a temperature of 40° to 50° Fahrenheit, and thoroughly incorporating ninety to ninety-five per cent. of such reduced cooled asphalt sand rock or bituminous sand with five to ten per cent. of powdered hard or rock asphalt or combination of the same, by mixing in the dry and cool state in suitable mixing apparatus until every grain of asphaltic sand has received its coating of powdered asphalt, the same when to be used to be heated by dry heat or steam, not by direct heat, and for the purposes specified.

WILLIAM ALBERT ADAMS.

Attest:
  A. S. LUDLOW,
  K. SMITH.